Nov. 13, 1928.

A. W. HOLMES ET AL 1,691,192

DISPENSING DEVICE

Filed June 25, 1926

INVENTORS.
ARTHUR W. HOLMES,
DONALD E. JAQUES,
HENRY B. COATS.

BY Lockwood & Lockwood

ATTORNEYS.

Patented Nov. 13, 1928.

1,691,192

UNITED STATES PATENT OFFICE.

ARTHUR W. HOLMES, OF VEEDERSBURG, DONALD E. JAQUES, OF THORNTOWN, AND HENRY B. COATS, OF VEEDERSBURG, INDIANA.

DISPENSING DEVICE.

Application filed June 25, 1926. Serial No. 118,467.

This invention relates to a portable feed dispensing device.

The chief object of this invention is to supply feed to a considerable number of feed troughs or pans in a most expeditious manner and with a minimum of spillage and waste.

The chief feature of the invention consists in the provision of the feed containing tank, said feed being of liquid mash type, agitating means therein for maintaining the consistency uniform, power pump means for supplying the mash to the valve controlling discharge flexible in character thereby facilitating positioning of the discharge outlet adjacent the feed receiving container.

Another feature of the invention consists in the knockdown arrangement of the power supply line support and its tubular protective character, said support also serving as a support for the free end of the discharge.

The full nature of the invention will be understood from the accompanying drawings and the following description and claims.

Figure 1:
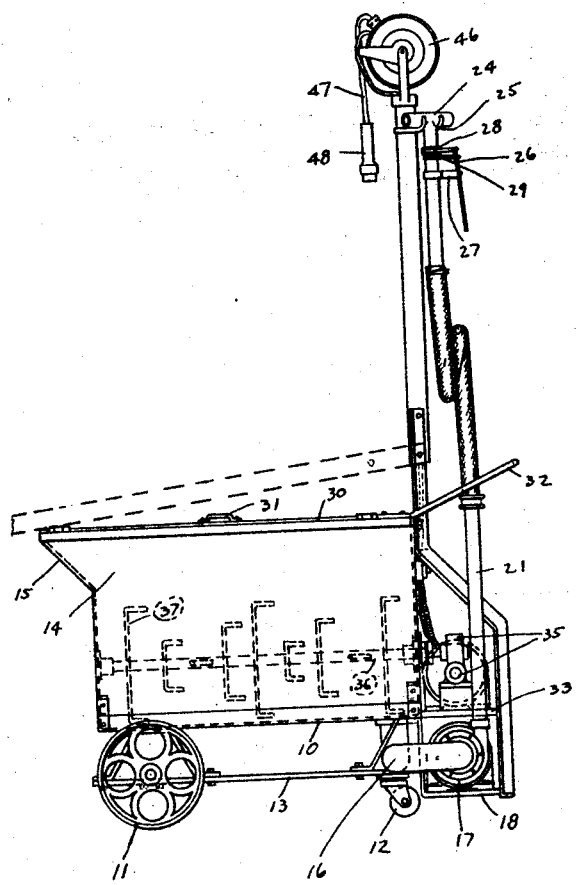
Figure 2:
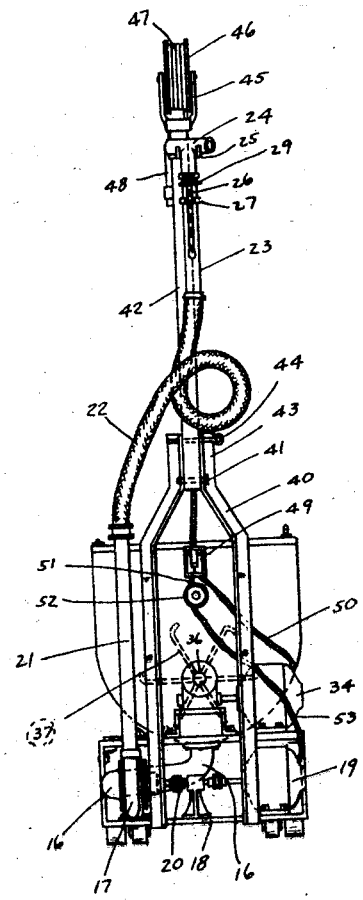

In the drawings Fig. 1 is a side elevational view of the invention with the parts in operative position, the dotted position of the support indicating the knockdown position thereof. Fig. 2 is an end view of the same.

In the drawings 10 indicates a framework supported by wheel means 11 and caster wheel means 12, the same being connected together by the auxiliary framework 13. A tank 14 has a flared rear end 15 for ease in cleaning and filling. The bottom of the tank is preferably pitched slightly and toward the opposite corner of the tank which discharges by gravity through the pipe 16 to a pump 17 mounted on the platform 18 carried forwardly of and on a lower level than the tank. Also mounted on platform 18 is a motor 19 connected as at 20 to said pump for driving the same. The pump includes a rigid upward discharge 21 connected to which is a flexible conduit 22 terminating in a rigid outlet 23 which is provided with transverse portion 24 at its free end for support purposes on the hooks 25 mounted as hereinafter pointed out. The rigid connection 23—24 is provided with suitable control valve means including an operating lever 26 fulcrumed at 27, said valve being indicated generally by the numeral 28 and normally maintained in closed position by a spring 29.

The tank is provided with suitable cover 30 including a handle 31 and extending forwardly thereof is the guiding and controlling handle 32. Above the platform 18 is another platform 33 and mounted thereon is a motor 34 which through a reduction gearing 35, rotates shaft 36 having a plurality of U-shaped rods 37 secured thereto in spaced relation and in angular offset relation to each other within said tank. The aforesaid constitutes an agitator which is adapted to keep the mash in an agitated condition and thus prevent the solid content from separating from the liquid content. The agitator also has the ends of the agitating rods 37 extending towards the discharge end of the tank and inclined sidewise, as shown in Fig. 2, so that it will not only agitate the contents, but will feed the contents towards the discharge end of the tank and assist the gravity flow of the mash to the gravity supply line 16 of the pump 17.

A pair of frame members 40 extend upwardly and form a yoke which supports pivot 41 and interposed therebetween is the tubular member 42 mounted on said pivot. The upper extensions 43 of the yoke are socketed to receive a locking pin 44 which is also associated with the tubular standard 42 and thus secured the standard in the upright position as shown by the full lines in Figs. 1 and 2. Withdrawal of the locking pin 44 permits the support to be tilted into position shown by the dotted lines in Fig. 1. The hooks 25 are suitably supported near the upper end of the tubular support 42 and thus the free end of the discharge line is supported in elevated relation. The support 42 also supports a fork 45 which pivotally supports a reel 46 including the power supply line 47 terminating in a plug connection 48. The other end of the line 47 after passing through the tubular support 42 and being protected thereby, connects to a switch 49 and a cable 50 leads therefrom to motor 34. Another cable 51 leads to switch 52 in turn controlling motor 19 through the cable 53. Thus whenever the motor 19 is energized motor 34 necessarily must be energized, but motor 34 may be energized without energizing motor 19, the switches being in series and the motors being in parallel. The result, therefore, is that the agitator is always operable while the pump is operable and the agitator is also operable at such times as may be desired without operating the pump. This permits the agitator to serve as a mixer as well as means for maintaining the mash in the desired physical condition without separation of the contents as set forth.

The resultant construction is a knockdown portable arrangement which greatly facilitates the supplying of feed to a plurality of trays or feed containers.

The invention claimed is:

1. A fluid dispensing machine including a tank for containing the fluid, wheels upon which the tank is mounted so as to render the same portable, a frame secured to the tank, a pump mounted in said frame for forcibly discharging the contents of the tank, an electric motor mounted in said frame for operating the pump, a standard mounted on the upper end of said frame so that it can be maintained in an upright position or turned down upon the top of the tank as desired, a reel on the upper end of the standard, and an electric supply line on said reel and connected with said motor, whereby said standard can be folded down on said tank when the machine is not in operation and when moved about in a poultry house, substantially as set forth.

2. A fluid dispensing machine as set forth in claim 14 with a flexible discharge tube connected to the pump, a valve controlled nozzle on the end thereof, and means secured to the upper end of said standard for removably supporting said nozzle.

In witness whereof, we have hereunto affixed our signatures.

ARTHUR W. HOLMES.
DONALD E. JAQUES.
HENRY B. COATS.

CERTIFICATE OF CORRECTION.

Patent No. 1,691,192. Granted November 13, 1928, to

ARTHUR W. HOLMES ET AL.

It is hereby certified that error appears in the printed specification of the above numbered patent requiring correction as follows: Page 2, line 28, claim 2, for the numeral "14" read "1"; and that the said Letters Patent should be read with this correction therein that the same may conform to the record of the case in the Patent Office.

Signed and sealed this 11th day of December, A. D. 1928.

(Seal)

M. J. Moore,
Acting Commissioner of Patents.